E. B. Ives.
Vegetable Cutter.
Nº 72,301.
Patented Dec. 17, 1867.
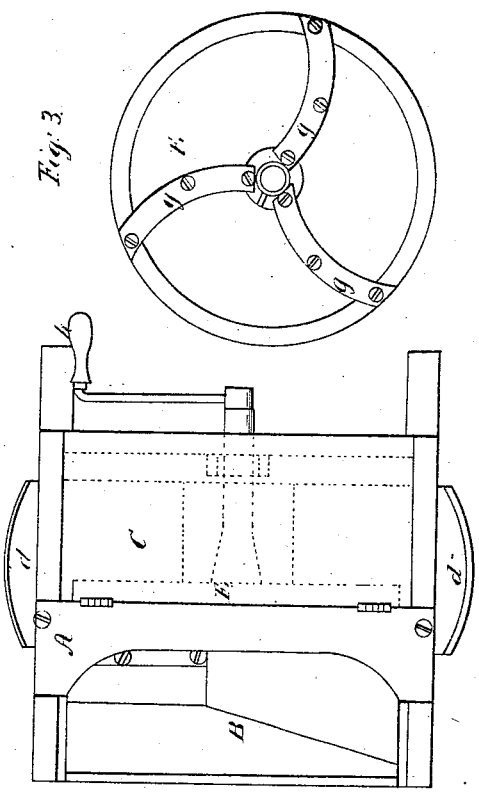
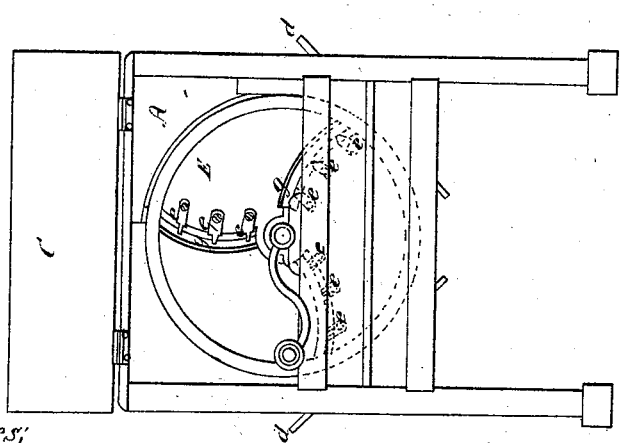
Witnesses:
Jno. A. Ellis
Jas. White
Inventor:
E. B. Ives
Per
T. H. Alexander & Co
Atty

UNITED STATES PATENT OFFICE.

ENOS B. IVES, OF BRISTOL, CONNECTICUT.

IMPROVED VEGETABLE-CUTTER.

Specification forming part of Letters Patent No. 72,301, dated December 17, 1867.

*To all whom it may concern:*

Be it known that I, ENOS B. IVES, of Bristol, in the county of Hartford and State of Connecticut, have invented certain new and useful Improvements in Vegetable-Cutters; and I do hereby declare that the following is a full, clear, and exact description thereof, reference being had to the accompanying drawings, and to the letters of reference marked thereon, which form a part of this specification, in which—

Figure 1 is a side elevation; Fig. 2, a plan view; and Fig. 3, a plan of the wheel with the circular knives attached thereto.

The nature of this invention consists in excavating the spaces on the face of the wheel between the circular knives, in order that a recess may be formed for the reception of the vegetables while undergoing the cutting process; also, for the purpose of enabling the circular knives to be properly set, which, from their peculiar shape, incline the vegetable to the center.

My invention further consists in the employment of the cross-knives, so arranged that they will divide the slices as they pass out.

To enable others skilled in the art to make and use my invention, I will now describe its construction and operation.

A represents the box, a plan of which is shown in Fig. 2. Said box is constructed with the hopper B and hinged lid C, and is further provided with the inclined slides $d\ d$.

E represents a wheel, with three circular slots cut in it, as partly seen in Fig. 1. Upon the face of this wheel, and between the slots, excavations are made, so that as it is revolving the vegetables will be properly sliced.

$g\ g\ g$ are three circular knives secured on the sides of the slots, as seen in Figs. 1 and 3. It will be observed that the curved shape of these knives inclines the vegetables to the center, and they thus more effectually perform their appropriate office.

$e\ e\ e$ represent small cross-knives, whose bases are secured on the reverse side of wheel E, while their blades extend across the slots, as partly seen in Fig. 1, so the slices, as they are cut by the circular knives, are divided by the cross-knives $e\ e\ e$. The wheel E is operated by crank $h$.

What I claim, and desire to secure by Letters Patent, is—

The wheel E, provided with knives $g\ g\ g$ and $e\ e\ e$, substantially as described.

In testimony that I claim the foregoing as my own I affix my signature in the presence of two witnesses.

E. B. IVES.

Witnesses:
 ANDREW F. WILLIAMS,
 ISAAC DYCER.